United States Patent
Nakajima

(12) United States Patent (10) Patent No.: US 7,138,985 B2
Nakajima (45) Date of Patent: Nov. 21, 2006

(54) TACTILELY ENHANCED VISUAL IMAGE DISPLAY

(75) Inventor: Satoshi Nakajima, Redmond, WA (US)

(73) Assignee: UI Evolution, Inc., Bellevue, WA (US)

( * ) Notice: Subject to any disclaimer, the term of this patent is extended or adjusted under 35 U.S.C. 154(b) by 702 days.

(21) Appl. No.: 10/255,475

(22) Filed: Sep. 25, 2002

(65) Prior Publication Data

US 2004/0056876 A1   Mar. 25, 2004

(51) Int. Cl.
*G09G 5/00*   (2006.01)

(52) U.S. Cl. .................... 345/173; 345/174; 178/18.01

(58) Field of Classification Search ........ 345/173–179; 178/18.01, 18.1, 19.01, 18.06
See application file for complete search history.

(56) References Cited

U.S. PATENT DOCUMENTS

| | | | | |
|---|---|---|---|---|
| 4,078,257 A | * | 3/1978 | Bagley | ........................ 708/145 |
| 6,028,591 A | * | 2/2000 | Lueders | ........................ 345/156 |
| 6,067,074 A | * | 5/2000 | Lueders | ........................ 345/156 |
| 6,636,203 B1 | * | 10/2003 | Wong et al. | ................. 345/173 |
| 6,661,563 B1 | * | 12/2003 | Hayashi et al. | ............. 359/296 |
| 2002/0054030 A1 | * | 5/2002 | Murphy | ........................ 345/173 |
| 2002/0140215 A1 | * | 10/2002 | Breed et al. | ................. 280/735 |
| 2002/0167495 A1 | * | 11/2002 | Quinn et al. | ................. 345/173 |
| 2002/0180709 A1 | * | 12/2002 | Lichtfuss | ..................... 345/173 |
| 2003/0071795 A1 | * | 4/2003 | Baldauf et al. | ............. 345/173 |
| 2003/0179190 A1 | | 9/2003 | Franzen | |

* cited by examiner

*Primary Examiner*—Xiao Wu
(74) *Attorney, Agent, or Firm*—Schwabe, Williamson & Wyatt, P.C.

(57) ABSTRACT

A tactile display layer is provided on a back side of a flexible visual display layer of a display to facilitate selective tactile pushing against different portions of the flexible visual display layer. In one embodiment, the display further includes a sensor circuit to sense user touching of activated ones of tactile pistons of the tactile display layer. In one embodiment, the display further includes a transparent touch sensitive layer disposed on a viewing side of the flexible visual display layer, with its effective touch sensitive area limited to a perimeter area surrounding the effective area of the tactile display layer.

12 Claims, 5 Drawing Sheets

TACTILELY ENHANCED VISUAL IMAGE DISPLAY

FIELD OF THE INVENTION

The present invention relates to the field of visual displays. More specifically, the present invention relates to a tactilely enhanced visual image display.

BACKGROUND OF THE INVENTION

Human-machine interface has long been a subject of interest to designers of human operated machinery, particularly for machines or devices intended for "unskilled" novice users, such as personal devices of various kinds, remote controls, palm-sized computing devices (also referred to as personal digital assistants (PDA)), laptop computers, and so forth. Improved ease-of-use, in general, improves user satisfactions.

Increasingly, as a result of advances in microprocessor and other related technologies, more and more personal devices are processor based and multi-functional. For example, today one can acquire a PDA that can also serve as a wireless mobile phone, a MP3 player and so forth.

Typically, the appropriate end user interfaces, i.e. the interfaces for operating one of these devices as a PDA, a wireless mobile phone, or a MP3 player and so forth, are presented on a touch sensitive screen on an as needed basis. A user would interact with the interface by touching the appropriate interface element, a visual image, e.g. a key or button image, or a menu or list item image.

Many of these graphical interfaces are intuitive, and easy-to-use. However, as friendly as these graphical interfaces are, there is no tactile feel to the touching of the key or button image (i.e. a user does not feel the clicking of a real key/button). The same applies to the selection of menu or list items. The lack of tactile feedback is "difficult" or "less satisfying" for some user.

Thus, it is desirable if the user experience may be further enhanced by providing the user with tactile sensations when interacting with at least some of the interface elements.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

The present invention includes a tactilely enhanced visual image display.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Parts of the description will be presented in terms, such as pixels, active matrix, pistons, and so forth, consistent with the manner commonly employed by those skilled in the art to convey the substance of their work to others skilled in the art.

The phrase "in one embodiment" is used repeatedly. The phrase generally does not refer to the same embodiment, however, it may. The terms "comprising", "having" and "including" are synonymous, unless the context dictates otherwise.

Section headings are merely employed to improve readability, and they are not to be construed to restrict or narrow the present invention.

Figure 1:
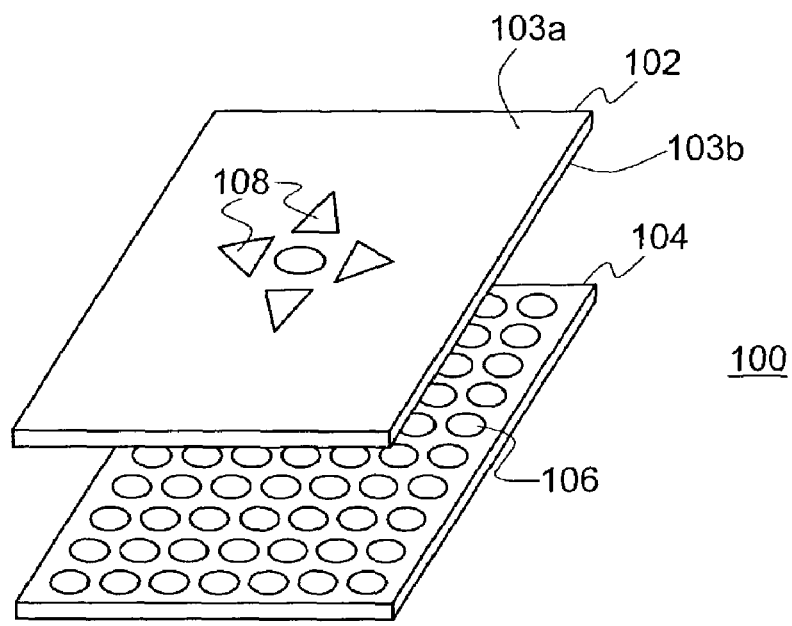
FIG. 1 illustrates an exploded perspective view of the relevant elements of the tactilely enhanced visual image display sub-assembly of the present invention, in accordance with one embodiment.

FIG. 1 illustrates an exploded perspective view of the relevant elements of the tactilely enhanced visual image display sub-assembly 100 of the present invention, in accordance with one embodiment. As illustrated, for the embodiment, tactilely enhanced visual image display sub-assembly 100 includes flexible visual display layer 102 and tactile display layer 104, disposed adjacent to each other. Tactile display layer 104 or more specifically, its pistons 106, are advantageously employed to tactilely enhance visual images rendered on flexible visual display layer 102, to further improve user experience, by providing the user with tactile sensations when interacting with the rendered visual images.

More specifically, flexible visual display layer 102 is employed for rendering visual images, such as the example "arrow" and "select" key array image 108 depicted.

For the embodiment, similar to conventional flat panel displays, flexible visual display layer 102 comprises a number of thin-film transistors forming a matrix of pixels (not shown) to facilitate visual image rendering.

Figure 2:
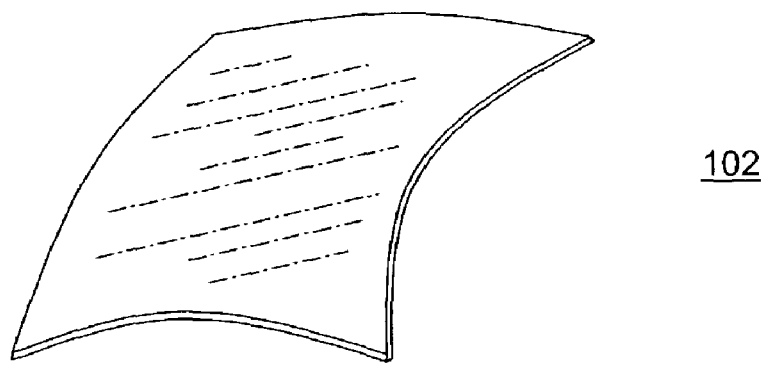
FIG. 2 illustrates a perspective view of the flexible visual display layer of FIG. 1 in a flexed position, in accordance with one embodiment.

However, unlike conventional flat panel displays, the thin-film transistors are plastic thin-film transistors, thus rendering flexible visual display layer 102 to be flexible, as illustrated in FIG. 2, where layer 102 is illustrated in a flexed position.

Figure 3:
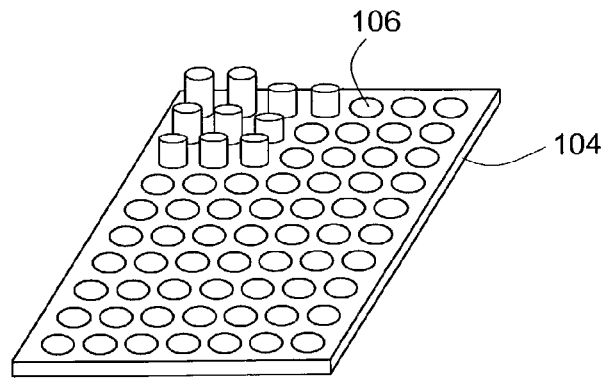
FIG. 3 illustrates a perspective view of the tactile display layer of FIG. 1 with a number of its pistons in an activated or raised position, in accordance with one embodiment.

Referring back to FIG. 1, tactile display layer 104 is employed to tactilely enhance the visual images rendered on flexible visual display layer 102. As alluded to earlier, tactile display later 104 includes a number of pistons 106, which may be selectively activated or raised, as illustrated in FIG. 3.

As described earlier, flexible visual display layer 102 and tactile display layer 104 are disposed adjacent to each other. More specifically, flexible visual display layer 102 has a viewing side 103a and a back side 103b, and tactile display layer 104 is disposed adjacent to flexible visual display layer 102 on the back side 103b of flexible visual display layer 102. Depending on the intended usage or orientation of the final assembly, viewing side 103a may also be referred as the top side or the front side, whereas back side 103b may also be referred as the bottom side.

Figure 5:
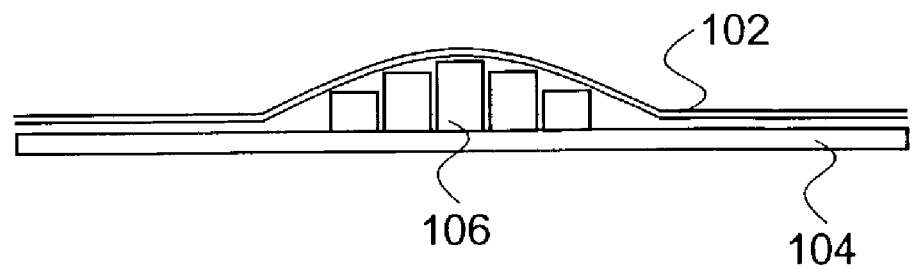
FIG. 5 illustrates a cross-section side view of the flexible visual display layer and the tactile display layer, with a number of pistons of the tactile display layer in an activated or raised position, pushing against the flexible visual display layer, in accordance with one embodiment.

Thus, as pistons 106 of tactile display layer 104 are selectively activated or raised, different portions or areas of flexible visual display 102 are being pushed against by the activated/raised pistons. Since, flexible visual display 102 is designed to be flexible, the corresponding areas being pushed by the selectively activated/raised pistons 106, present to the user a raised condition, as illustrated by FIG. 5.

Therefore, if a key or button image, or a menu or list item is rendered on the area of flexible visual display layer 102 being pushed by the selectively activated/raised pistons 106, the user perceives a raised key or button, or raised menu or list item.

In various embodiments, pistons 106 may be further provided with different degree of resistance to a user touching or pushing against them. Accordingly, depending on the application and the desire of the designer, different degree of hardness may be manifested for the user.

As a result, the present invention enables a designer to present to a user with an interface on demand, where the interface may include keys, buttons, menu/list items that are dynamically formed, and non-persistent, and yet these dynamically formed non-persistent keys, buttons, and menu/list items may provide an interacting user with some degrees of tactile sensations that approximate permanently formed "hard" keys/buttons.

Still referring to FIG. 1, in various embodiments, flexible visual display layer 102 has a thickness in the range of 0.1 mm to 1.0 mm. In alternate embodiments, flexible visual display layer 102 may be thicker or thinner.

Further, in alternate embodiments, other circuit technology beside plastic thin-film transistors may be employed to provide the visual image rendering capability of sub-assembly 100 with the desired thinness and flexible attribute.

Figure 4A:
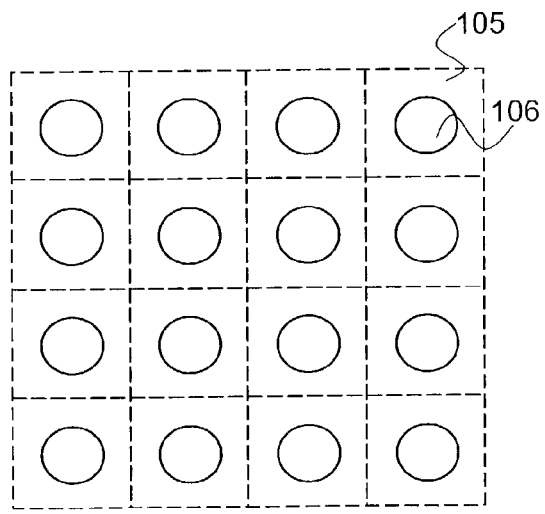
FIGS. 4a–4b illustrate the alignment relationships between the pixels of the flexible visual display layer and the pistons of the tactile display layer, in accordance with two embodiments.
Figure 4B:
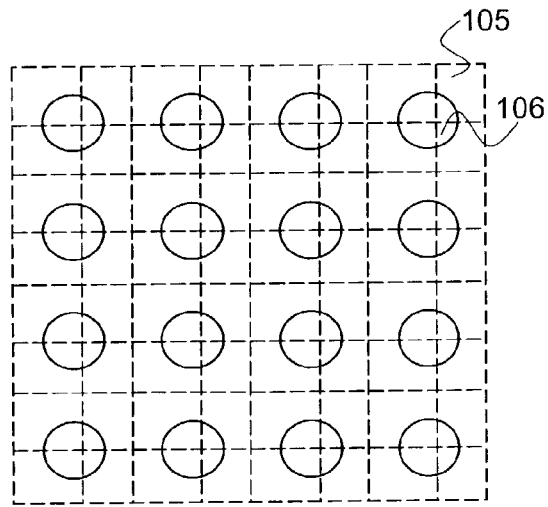

FIGS. 4a–4b illustrate the alignment relationships between the pixels of the flexible visual display layer 102 and pistons 106 of tactile display layer 104, in accordance with two embodiments. In various embodiments, flexible visual display layer 102 comprises m×n pixels 105. Typically, although not necessarily, m and n are integers, and equal to a power of 2. Similarly, tactile display layer 104 comprises p×q pistons 106. Typically, although also not necessarily, p and q are integers, and also equal to a power of 2.

For the embodiment of FIG. 4a, the pixels of flexible visual display layer 102 and the pistons 106 of tactile display layer 104 are 1:1 aligned. That is, the size of each pixel 105 and the size of the each piston 106 is approximately the same. In one embodiment, m and n equal p and q respectively.

For the embodiment of FIG. 4b, each piston 106 is aligned with a group of pixels 105. That is, the size of each piston 106 is approximately that of the size of the group of pixels 105 to which it corresponds. In one embodiment, m and n are multiples of p and q respectively, i.e. 2×, 3× and so forth.

Figure 6:
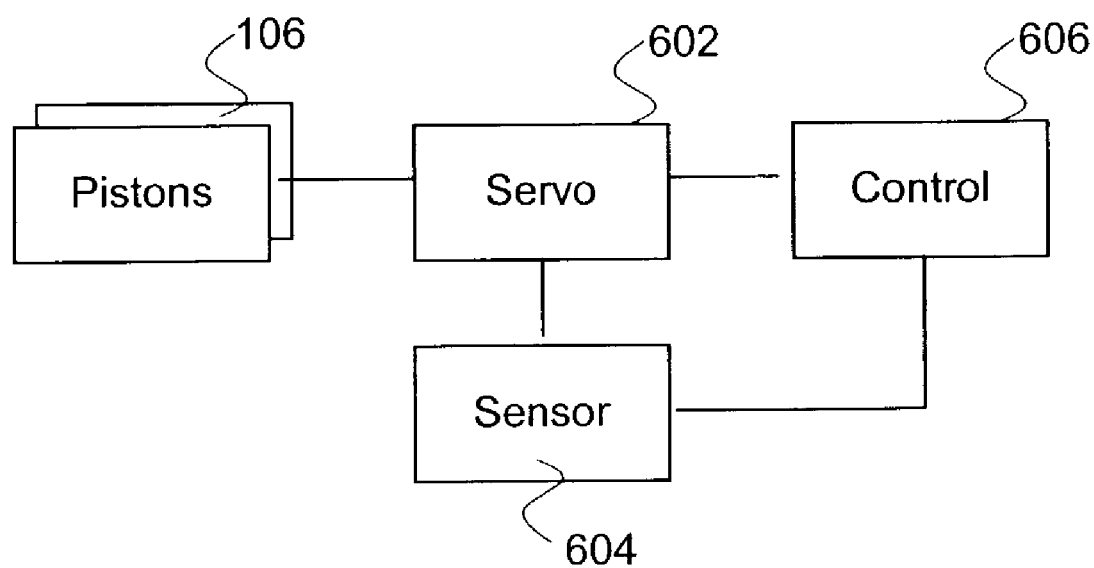
FIG. 6 illustrates an architectural view of the pistons of the tactile display layer and companion elements, in accordance with one embodiment.

FIG. 6 illustrates an architectural view of the pistons 106 of the tactile display layer 104 and the companion elements, in accordance with one embodiment. As illustrated, for the embodiment, pistons 106 are connected to a servo mechanism 602 that is responsible for activating or raising pistons 106 as earlier described. Further, for the embodiment, servo mechanism 602 is also responsible for providing resistance to pistons 106 to simulate various degrees of hardness for a user.

For the embodiment, tactile display layer 104 is also provided with sensor 604 coupled to servo mechanism 602 as shown. Sensor 604 is employed to sense a user's interaction with the tactilely enhanced visual image, which as described earlier, may be "emulating" an input key/button.

Sensor 604 enables the sub-assembly 100 to be touch sensitive, in addition to rendering tactilely enhanced visual images.

For the embodiment, both servo mechanism 602 and sensor 604 are controlled by controller 606. In various embodiments, controller 606 is in turn coupled to and controlled by a processor of a host device, e.g. a PDA.

Any one of a number of known servo mechanisms, sensor circuits and controllers may be employed to practice the present invention.

Thus, from the foregoing description, it can be seen that tactilely enhanced visual images may be advantageously provided to improve user experience, by providing a user with tactile sensation when interacting with an interface element of a user interface. The tactilely enhanced visual image display may also be touch sensitive.

Figure 7:
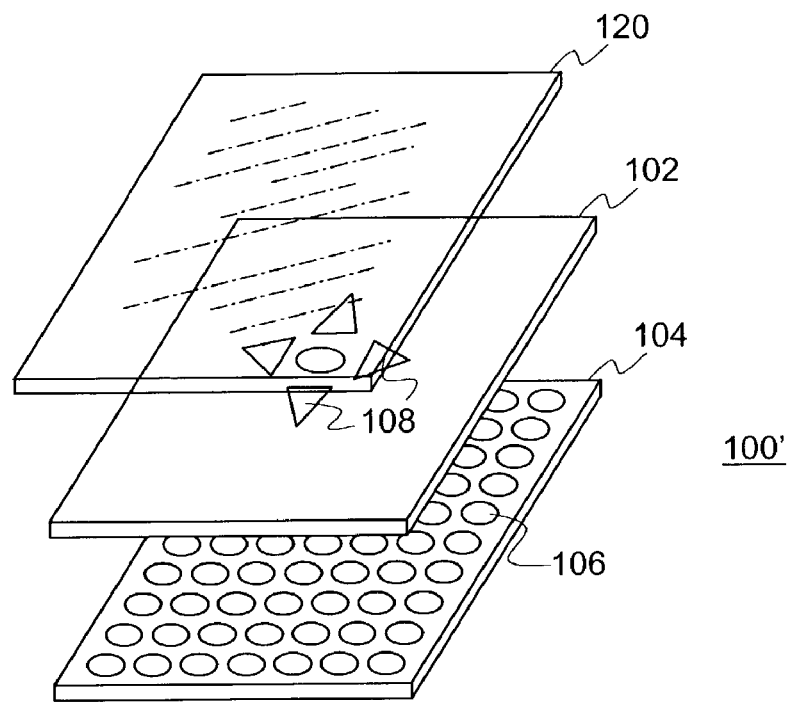
FIG. 7 illustrates an exploded perspective view of the relevant elements of the tactilely enhanced visual image display sub-assembly of the present invention, in accordance with another embodiment.

FIG. 7 illustrates an exploded perspective view of the relevant elements of tactilely enhanced visual image display sub-assembly 100' of the present invention, in accordance with another embodiment. The embodiment advantageously provides tactilely enhanced visual image display with touch sensing, as well as conventional touch sensing of non-tactilely enhanced visual images.

Similar to the embodiment of FIG. 1, sub-assembly 100' also includes flexible visual display layer 102 and tactile display layer 104 adjacently disposed and complement each other as earlier described. Except, for the embodiment of FIG. 7, sub-assembly 100' also includes a transparent touch sensitive layer 120 disposed also adjacent to the flexible visual display layer 102, on the viewing side of flexible visual display layer 102. Further, for the embodiment, tactile display layer 104 comprises pistons 106 only in a core area to tactilely enhance visual images rendered on a corresponding core area of flexible visual display layer 102. This core area is also referred to as the effective area of tactile display layer 104.

Transparent touch sensitive layer 120 is provided to equip sub-assembly 100' with conventional touch sensing capability, i.e. for conventional non-tactilely enhanced visual images.

As its name suggests, touch sensitive layer 120 is transparent, such that the visual images rendered on flexible visual display layer 102 remain visible to a user, notwithstanding the fact that touch sensitive layer 120 is disposed on the viewing side of flexible visual display layer 102.

Figure 8:
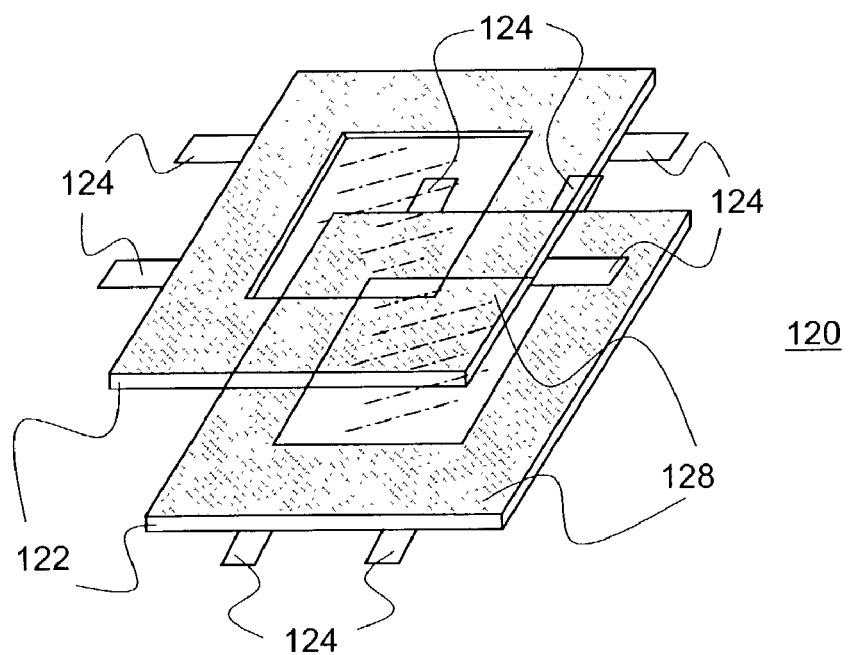
FIG. 8 illustrates the transparent touch sensitive layer of FIG. 7 in further details, in accordance with one embodiment.

As illustrated in FIG. 8, in one embodiment, transparent touch sensitive layer 120 comprises two transparent spaced sub-layers 122. The facing inside surfaces of the spaced sub-layers 122 are at least partially coated with transparent (see through) conductive materials 128. An example of a suitable substantially transparent conductive material is indium-tin oxide.

Each sub-layer 122 also includes a number of leads 124 to facilitate determination of the contact point, i.e. the point touched by a user.

For the embodiment, both sub-layers 122 are flexible, such that when pistons 106 are selectively activated to tactilely enhanced a visual image rendered in a corresponding area on flexible visual display 102, the tactile enhancement will "show through" the added transparent touch sensitive layer 120.

For the embodiment, the two facing inside surfaces of sub-layers 122 are coated with the transparent conductive materials in the perimeter area surrounding the core effective area of tactile display layer 104 only. Thus, when pistons 106 of tactile display layer 104 are employed to tactilely enhanced visual images rendered in the corresponding core area of flexible visual display layer 102, pushing against flexible visual display layer 102 and transparent touch sensitive layer 120, touch sensitive layer 120 would not report touching by the user. For the core area, touching by the user will continue be reported by tactile display layer 104.

Thus, for devices employing sub-assembly 100, conventional touching sensing for the area surrounding the effective area of tactile display layer 104 may also be provided. In other words, conventional touch sensing for sub-assembly 100' has essentially a hollowed effective area, surrounding the effective core area of tactile display layer 104.

In alternate embodiments, the facing inside surfaces of sub-layers 122 may be fully coated with transparent conductive materials as conventional touch sensitive layer, but complemented with a limiting circuit to exclude the reporting of user touching for the effective core area of tactile display layer 106.

For these embodiments, the electrical models of touch sensing are re-calibrated for the various activations of pistons 106, and detection of user touching by touch sensitive layer 120 further factors into consideration whether any of pistons 106 are activated.

In other words, for these embodiments, transparent touch sensitive layer 120 has a nominal effective area with an area size equals to the total surface of the layer. This size of this effective area is larger than the size of the effective core area of tactile display layer 104. However, the limiting circuit modifies the nominal effective area to a hollowed effective area surrounding the effective core area of tactile display layer 104.

In other alternate embodiments, touch sensitive layer 120 is capacitance based instead. That is, touch sensitive layer 120 is a "field sensitive" touch layer instead.

Figure 9:
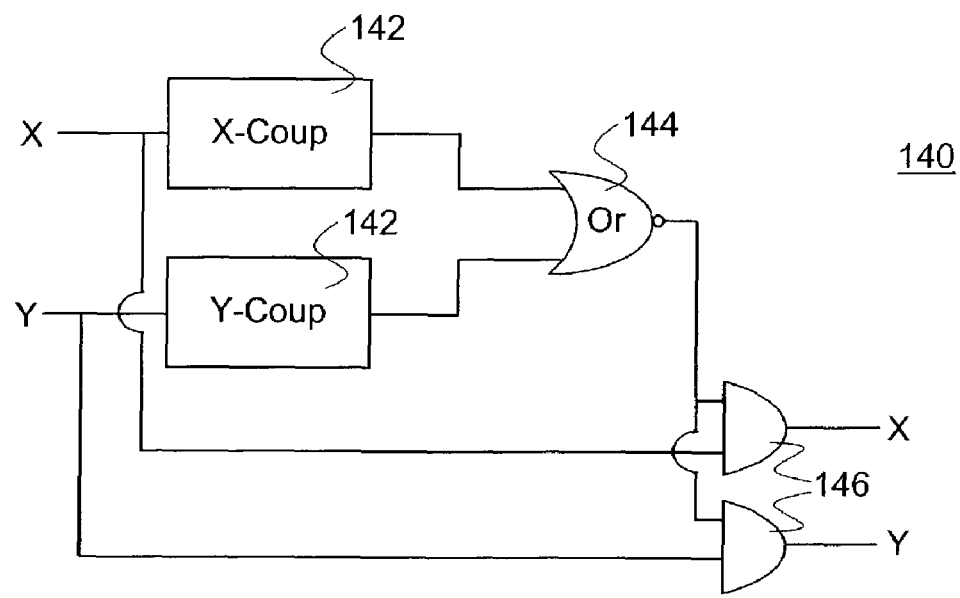
FIG. 9 illustrates a companion limiting circuit of the transparent touch sensitive layer, in accordance with another embodiment.

An example limiting circuit suitable for practicing with these embodiments of the present invention is illustrated in FIG. 9. Limiting circuit 140 includes a number of comparison circuits 142, an OR gate 144 and a number of AND gates 146.

Comparison circuits 142 are employed to determine whether the location of a sensed contact is within the effective core area of tactile display layer 104. Preferably, the coordinates of the effective core area of tactile display layer 104 are configurable. The results of the comparisons are provided to OR gate 144.

OR gate 144 is employed to combine the two signals together, producing a true signal if at least one of the x or y coordinate of the sensed contact point is within the effective core area of tactile display layer 104. For the embodiment, the invert of the true signal is provided to AND gates 146.

AND gates 146 are employed to negate any reporting, if it is determined that at least one of the coordinate values is within the effective core area of tactile display layer 104.

Thus, it can be seen from the foregoing further description that tactilely enhanced visual image display with touch sensing may also be provided with conventional touch sensing for non-tactilely enhanced visual images.

Figure 10:
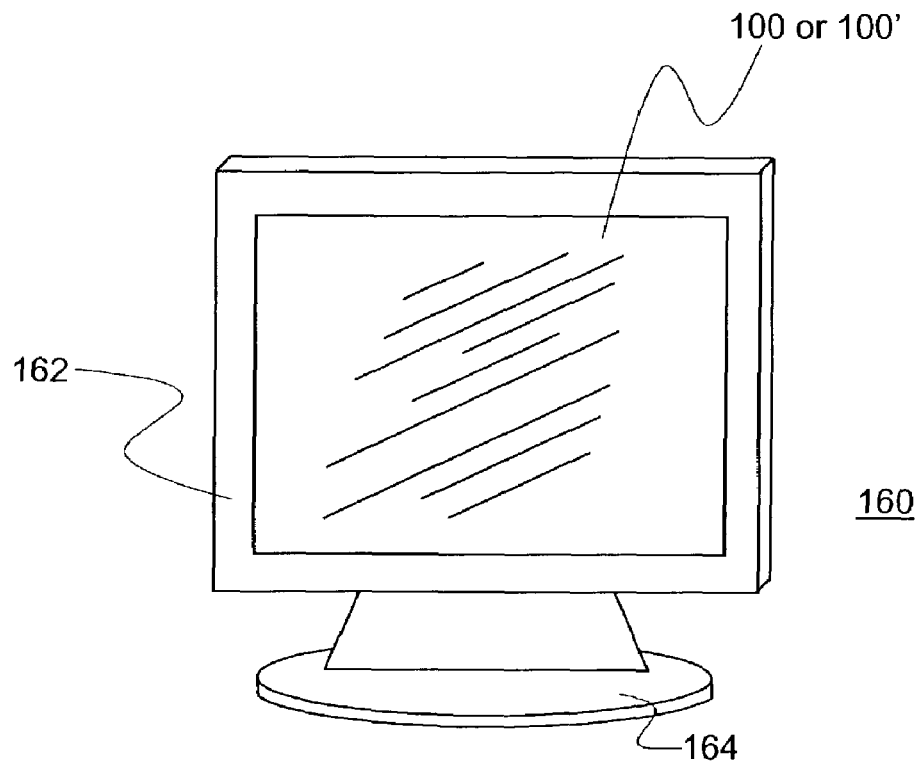
FIG. 10 illustrates an assembled perspective view of a tactilely enhanced visual image display device of the present invention, in accordance with one embodiment.

FIG. 10 illustrates an assembled perspective view of a tactilely enhanced visual image display device of the present invention, in accordance with one embodiment. As illustrated, display 160 includes either the tactilely enhanced visual image sub-assembly 100 of FIG. 1 or the tactilely enhanced visual image sub-assembly 100 of FIG. 7 or an equivalent sub-assembly. Subassembly 100, or 100' or its equivalent is encased in body 162, and supported by support mechanism 164.

Display 160 may be employed in any one of a number of computing applications. As those skilled in the art would appreciate, sub-assembly 100 or 100' or its equivalent may be employed in other display applications, including but not limited to palm size computing devices, tablet computing devices, laptop computing devices, set-top boxes, media players and so forth.

CONCLUSION AND EPILOGUE

Thus, it can be seen from the above descriptions, a novel tactilely enhanced visual image display sub-assembly and device have been described.

While the present invention has been described in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A display comprising:
   a transparent touch sensitive layer having a touching side and a back side, and a hollowed effective area;
   a flexible visual display layer having a viewing side and a back side, disposed adjacent to the transparent touch sensitive layer on the back side of the transparent touch sensitive layer; and
   a tactile display layer having tactile pistons, disposed adjacent the flexible visual display layer on the back side of the flexible visual display layer, to facilitate selective tactile pushing against different portions of the flexible visual display, the tactile display layer having an effective area substantially aligned with the ineffective portion of the transparent touch sensitive layer.

2. The display of claim 1, wherein the flexible visual display layer comprises a plurality of tin film transistors.

3. The display of claim 1, wherein the flexible visual display layer comprises a plurality of plastic transistors.

4. The display of claim 1. wherein the flexible visual display layer having a thickness in the range of 0.1 mm to 1.0 mm.

5. The display of claim 1, wherein the flexible visual display layer comprises a matrix of m×n display pixels, and the tactile display layer comprises p×q tactile pistons.

6. The display of claim 5, wherein m and n are at least 2× multiples of p and q respectively.

7. The display of claim 5, wherein m equals q, and n equals q.

8. The display of claim 1, wherein the display further comprises a sensor circuit coupled to the tactile display layer to sense user touching of activated ones of the tactile pistons.

9. The display of claim 1, wherein the transparent touch sensitive layer comprises a first and a second sub-layer, where the sub-layers are spaced, flexible and having facing inside surfaces coated with conductive materials.

10. The display of claim 9, wherein the facing inside surface of the first sub-layer is partially coated in a hollowed manner.

11. The display of claim 1, wherein
the transparent touch sensitive layer has a nominal effective touch sensitive area of size A1, and the tactile display layer has an effective area of size A2, where A1 is greater than A2; and
the display further comprises a limiting circuit to limit the effective touch sensitive area of the transparent touch sensitive layer to the perimeter area surrounding the effective area of the tactile display layer.

12. The display of claim 1, wherein the transparent touch sensitive layer is capacitance based.

* * * * *

UNITED STATES PATENT AND TRADEMARK OFFICE
CERTIFICATE OF CORRECTION

PATENT NO. : 7,138,985 B2  Page 1 of 1
APPLICATION NO. : 10/255475
DATED : November 21, 2006
INVENTOR(S) : Satoshi Nakajima It is certified that error appears in the above-identified patent and that said Letters Patent is hereby corrected as shown below:

Column 1
Line 38, "...for some user..." should read --...for some users...--.

Column 2
Line 9, "... in further details..." should read --... in further detail...--.

Column 3
Line 36, "...different degree of..." should read --... different degrees of...--.

Column 4
Line 1, "...of each the piston..." should read --...of each piston...--.

Column 5
Line 13, "...tactilely enhanced a..." should read --...tactilely enhance a...--.
Line 22, "...enhanced visual..." should read --... enhance visual...--.
Line 48, "...size equals to ..." should read --... size equal to...--.
Line 48, "This size..." should read --The size...--.

Column 6
Line 62, "...of tin film..." should read --... of thin film...--.
Line 65, "...of claim 1. wherein..." should read --... of claim 1, wherein...--.
Line 66, "...layer having a thickness..." should read --...layer has a thickness...--.

Signed and Sealed this

Nineteenth Day of June, 2007

JON W. DUDAS
*Director of the United States Patent and Trademark Office*